United States Patent Office 2,695,215
Patented Nov. 23, 1954

---

2,695,215

PRODUCTION OF CHROMIUM OXIDE

William A. Pollock, Allentown, Pa., assignor to C. K. Williams & Co., East St. Louis, Ill., a corporation of Delaware No Drawing. Application May 16, 1950,
Serial No. 162,397

5 Claims. (Cl. 23—145)

This invention relates to the production of chromium oxide and more particularly to the manufacture of chromium oxide pigments by the reduction of sodium chromate or dichromate and calcination of the reduced product.

It has heretofore been proposed that chromium oxide be produced by this general process through steps involving reducing sodium chromate with sodium sulfide or with sulfur or with either or both in the presence of sodium hydroxide, next washing with water to remove the sodium thiosulfate formed as well as other impurities from the chromium hydroxide colloidal precipitate formed, and finally calcining the chromium hydroxide. These processes have several disadvantages including especially the expense in recovering the sodium thiosulfate due to the difficulty in separating the same with various other impurities from the chromium hydroxide which is in a semi-gelatinous condition. This purification step requires large equipment and takes much time. These prior processes generally must sacrifice yields for the sake of high quality in the final pigment.

The purpose of the present invention is to provide a process which is more practical and economical than such prior processes. Specifically, an object is to provide a straight line production method for preparing chromium oxide using conventional handling means. Another is to reduce the quantity of and utilize the by-products formed.

Another object is to eliminate the above mentioned hereinbefore required difficult and costly pre-calcination steps employed for the purification of the chromium compounds and by-product recovery. Additional objects are to reduce the time consumed in the process and to produce a product which can be calcined at relatively low temperatures and therefore at lower cost.

Still another object of importance is to provide a process for producing various shades of chromium oxide by simple manipulation of the process not requiring any substitution of different chromium salt raw materials.

In a preferred embodiment, the present invention involves the production of chromium oxide by first reducing sodium chromate with sodium sulfide thereby forming a reaction mass containing chromium hydroxide and sodium thiosulfate, next reacting sodium chromate with most if not all of the sodium thiosulfate therein, thereby forming hydrated oxide of chromium in the reaction mass containing the chromium hydroxide and then calcining the mixed reaction product to produce the chromium oxide. To bring about the reaction of the thiosulfate the alkalinity of the reaction mass must be reduced and, as hereinafter disclosed in the specific example, it is preferably accomplished by adding an acid and sodium dichromate (an acid salt). This oxide pigment may then be easily purified and prepared as a pigment by dissolving out the soluble salts, drying and grinding.

For the production of the chromium hydroxide in admixture with sodium thiosulfate, the invention broadly contemplates any of the known processes described in the art. These processes inherently involve highly alkaline reaction conditions due to the utilization of salts which hydrolyze in solution and provide hydroxyl ions. Such processes provide for mixing the reactants in any way in which the desired reaction will occur with either reactant being added to the other, or both flowed together. Preferably it is accomplished by adding a solution of sodium chromate to an emulsion, suspension or slurry of sulfur in sodium hydroxide, or to a solution of sodium sulfide or polysulfide, or to an aqueous mass containing a mixture of such reagents. Although the chromium compound used may be either the chromate, the dichromate or mixtures of the same, superior results are obtained when a mixture of about 14 to 18 per cent of the former with about 82 to 86 per cent of the latter are used. The reaction is ordinarily carried out at elevated temperatures up to those at which the reaction mass boils.

In accordance with a special feature of the invention, the alkalinity of the chromium hydroxide-sodium thiosulfate reaction mass is reduced to a level approaching neutrality. It has been ascertained that the shade of the chromium oxide ultimately obtained is lightened by this adjustment and pigments in greater commercial demand will result. This step, which also increases yields, can be accomplished simply by the addition of sulfuric acid or other suitable acid. If the alkalinity is not changed a shade of green is obtained of limited commercial value.

In its broadest adaptation, the invention is applicable to the production of chromium oxide from any slurry of chromium hydroxide no matter what the source. The simple addition to the slurry of sodium thiosulfate in any desired amount forms a suitable reactant for the second reduction reaction.

In accordance with this second or main step of the present invention, the reaction mass or specially prepared slurry containing the chromium hydroxide, sodium thiosulfate and generally also various salt impurities is reacted with an additional quantity of a sodium chromate compound which may either be in the form of a concentrated solution or in the form of crystals, the amount of the lattter used being preferably sufficient to react with most but not all of the sodium thiosulfate present in the reaction mass. The resulting mass in dry-to-moist condition containing the two chromium reaction products, sodium sulfite and impurities is then subjected to a calcination in any suitable furnace which may be of the reverberatory, muffle or rotary type.

The first reduction reaction is believed to proceed in accordance with the course indicated by the following equation:

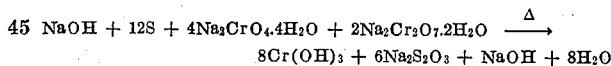
$$NaOH + 12S + 4Na_2CrO_4 \cdot 4H_2O + 2Na_2Cr_2O_7 \cdot 2H_2O \xrightarrow{\Delta}$$
$$8Cr(OH)_3 + 6Na_2S_2O_3 + NaOH + 8H_2O$$

According to publisher reports the sodium hydroxide and sulfur form sodium sulfide initially which in turn reacts with the chromates.

The second reduction reaction is believed to proceed in accordance with the following equation:

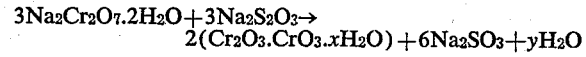
$$3Na_2Cr_2O_7 \cdot 2H_2O + 3Na_2S_2O_3 \rightarrow$$
$$2(Cr_2O_3 \cdot CrO_3 \cdot xH_2O) + 6Na_2SO_3 + yH_2O$$

Since the sodium sulfite formed is itself a reducing agent for the chromate, an amount of chromate in excess of that which will react with the thiosulfate may be added and additional hydrated chromium oxide will be produced. This modification, however, is not as efficient as when the lesser amount of the chromate is employed.

*First reduction reaction*

In accordance with a preferred procedure, an emulsion is prepared by heating together sulfur (325 mesh), sodium hydroxide, and water in an amount sufficient to permit adequate agitation and to provide a mass suitable for pumping to the vessel in which the reaction is to take place. This emulsion is satisfactorily produced by heating 4,000 pounds of sulfur with 350 pounds of sodium hydroxide together with the required amount of water. This mass is heated to 170° to 180° F. and transferred to a large precipitation vessel.

Thereupon an aqueous solution containing the equivalent of 5 pounds of sodium dichromate per gallon (which at pH 7 actually contains approximately 15% sodium dichromate or $Na_2Cr_2O_7 \cdot 2H_2O$, and 85% sodium chromate or $Na_2CrO_4 \cdot 4H_2O$) is carefully added to the emulsion. After the exothermic reaction has commenced, the rate of addition of the sodium dichromate is properlpy regulated to cause the desired reaction to proceed. If it is introduced too rapidly, the formation of sodium sulfide will cease and thus stop the reaction, and if it is too slow, it will cause a drop in temperature and a resultant cessation of sulfide formation.

A total of 2,400 gallons of solution or 12,000 pounds of the equivalent of sodium dichromate is added over a period of approximately 3 hours. The temperature of the mass will ultimately reach about 220° F. Upon completion of the reaction, the mass will contain chromium hydroxide slurried in a solution of sodium thiosulfate and sodium hydroxide.

Sulfuric acid of a specific gravity of 1.2 to 1.3 is slowly added to the reaction mass during agitation until there is obtained a definite pH value predetermined to provide the shade desired in the final calcined product. Adjustment to different levels between pH 7 and 10 will give a good variety of shades. A pH 9 will ultimately yield a somewhat lighter shade of chromium oxide, while an adjustment to a pH of 7 will yield a much lighter shade.

Although the neutralization may be effected immediately after completion of the reaction while the mass is at the temperature of boiling, it is preferred that it not be effected until the temperature of the slurry has dropped to about 150° to 160° F. In this manner excessive sulfur dioxide formation is avoided.

*Second reduction reaction*

The completely or partially neutralized slurry obtained in the first reduction process containing the chromium hydroxide and the sodium thiosulfate is next reacted with sodium dichromate either in solution, in the form of crystals, or as mixtures of the same dependent upon the desired "dryness" of the resultant solid reaction product. The exothermic heat of the reaction and the hydration of the chromium oxide takes up most if not all of the water present. The quantity of sodium dichromate employed is based on the amount of sodium thiosulfate present.

In accordance with a feature of the invention darker and stronger pigments are obtained by using a quantity of sodium dichromate somewhat less than the theoretical amount required for complete reaction. A quantity which will react with from 75 to 90% of the sodium thiosulfate present in the slurry generally gives best results.

This second reduction reaction is preferably carried out during constant agitation as can be suitably obtained in a dough mixer, such that instead of obtaining the final reaction product in a solid, difficultly grindable mass not ready for calcining, it is obtained as a uniformly aggregated or granular mass easily flowed or conveyed to and handled in conventional calcining furnaces, as a moist or dry mass. This procedure constitutes the subject matter of copending application, Serial Number 162,399, filed May 16, 1950 by Clifford G. Frayne now Patent Number 2,560,338 issued July 10, 1951.

The reaction may be accomplished by introducing approximately 65 gallons of the slurry from the first reduction reaction into a dough mixer and then introducing 30 gallons of a solution of sodium dichromate of 10 pounds per gallon strength. Instead, 300 pounds of sodium dichromate crystals or a mixture of crystals and solution may be added.

The reaction product from the dough mixer containing chromium hydroxide and chromium oxide compounds (the equivalent of approximately 280 pounds of $Cr_2O_3$) and one or more soluble salt impurities may then be fed directly to the calcining kiln. If the product is stored before it is calcined, it may harden into lumps, but these can easily be broken up by passing the mass through a simple sawtooth crusher.

In the kiln the reaction mass may be converted to chromium oxide of pigment grade by heating the same to a temperature of from 1650° to 1950° F. The higher temperatures up to 2500° F. recommended or required for various processes of the prior art are not necessary in the instant process.

When a rotary kiln is employed for the calcination an appreciable amount of dust may be formed. This dust consisting essentially of $Cr_2O_3$ or $CrO_2$ with sodium sulfate is collected, recirculated in the process and reintroduced into the dough mixer or other vessel in which the second reduction reaction takes place. In the reaction as described, from 75 to 85 pounds of dust containing approximately 35 to 40 pounds of $Cr_2O_3$ are reintroduced into the system with the batch in each dough mixer.

The calcined product or clinker is composed of a mixture of chromium oxide and sodium sulfate and generally also small amounts of other soluble salt impurities. This mixture is cooled and then introduced into dissolving tanks where dissolution of the sodium sulfate is effected by agitation of the slurry with water. The solution of the soluble salts may then be easily removed from the discrete chromium oxide particles by decantation or filter pressing or a combination of both, and then washing. Thereupon the oxide may be pressed to approximately 24% moisture content and then dried suitably on a moving apron drier. The dry product obtained is then pulverized, stored and then packed for shipment. A high grade chromium oxide pigment is thereby obtained.

The instant invention has a number of important advantages including the following:

1. A smoothly operating process is provided using only conventional types of operations and equipment.
2. Purer chromium oxide pigments are more easily obtained.
3. The by-products are efficiently utilized and as a result a much higher yield of chromium oxide from the soluble chromium salt used is accomplished.
4. Low calcination temperatures can be used thereby providing low fuel costs and a low rate of deterioration of refractory kiln linings.

The "chromate" compounds subjected to the reduction process, as this term is herein employed, includes the dichromates as well as the monochromates, and also mixtures of the same. Although only the salts and hydroxide of sodium are referred to herein, derivatives of potassium or other alkali metals may alternatively be employed.

I claim:

1. The process of producing chromium oxide pigments which comprises reacting sodium chromate with a sodium sulfide thereby forming a reaction mass containing chromium hydroxide and thiosulfate in a highly alkaline reaction mass, adding an acid material in a quantity lowering the pH value below 9, mixing with said reaction mass sodium chromate in a quantity calculated to react with at least 75 per cent of the sodium thiosulfate present, reacting the chromate with the thiosulfate thereby forming hydrated chromium oxide and sodium sulfite in admixture with the chromium hydroxide, calcining the resulting mixed product at a temperature of from 1650° to 1950° F., washing the calcined product to remove soluble impurities and drying and grinding to provide chromium oxide pigment.

2. In the production of chromium oxide pigments from sodium chromate the process which comprises slowly adding an aqueous solution of sodium dichromate to a heated emulsion of sulfur in an aqueous alkaline solution at a rate causing reduction to occur and a highly alkaline reaction mass containing chromium hydroxide and sodium thiosulfate to be formed, lowering the alkalinity of the reaction mass to a pH value below 9 at which the chromate will react with the thiosulfate, by the addition of acid adding to said reaction mass a quantity of sodium chromate calculated to react with at least 75 per cent of the sodium thiosulfate present, reacting the chromate with the thiosulfate thereby forming hydrated chromium oxide and sodium sulfite in admixture with the chromium hydroxide, calcining the resulting mixed product at a temperature of from 1650° to 1950° F., washing the calcined product to remove soluble impurities and drying and grinding to provide chromium oxide pigment.

3. In the production of chromium oxide pigments by the calcination of chromium compounds obtained by the reduction of sodium dichromate, the improvement wherein the sulfur consumption in relation to the chromium product produced is substantially reduced which comprises reacting sodium dichromate with a sodium sulfide thereby forming a highly alkaline reaction mass containing chromium hydroxide and sodium thiosulfate, adding sodium dichromate to the reaction mass in a quantity calculated to react with 75 to 90 per cent of the sodium thiosulfate present, and reacting the same in the reaction mass at a hydrogen ion concentration lowered to a pH value below 9 whereby a hydrated oxide of chromium is formed in the reaction mass containing the chromium hydroxide already present, the said mixture being calcined to provide a chromium oxide pigment.

4. In the production of chromium compounds for conversion to chromium oxide by calcination involving reduction of chromates by means of sulfur, the improvement whereby the yield of said chromium compounds is greatly increased in relation to the sulfur consumed, which comprises reducing an alkali metal chromate with sulfur in the presence of an alkali metal hydroxide thereby forming a highly alkaline reaction mass containing chromium hydroxide and sodium thiosulfate, adding an alkali metal chromate compound to the reaction mass and lowering the alkalinity of the mass to a pH value below about 9 at which the thiosulfate will react with the chromate compound, reacting the chromate compound with the thiosulfate present therein, thereby forming a sulfite as a by-product in a reaction mass containing a hydrated oxide of chromium in addition to the chromium hydroxide already therein.

5. In the production of chromium compounds for conversion to chromium oxide by calcination through reduction of chromates by means of sulfur, the improvement whereby the yield of said chromium compounds is greatly increased in relation to the sulfur consumed, which comprises reacting an alkali metal chromate with sulfur in the presence of an alkali metal hydroxide thereby forming a highly alkaline reaction mass containing chromium hydroxide and sodium thiosulfate, adding sulfuric acid to the reaction mass in a quantity which reduces the pH to a value of from about 7 to 10, and mixing an alkali metal dichromate with the reaction mass and reacting the same with the thiosulfate therein, thereby forming a hydrated oxide of chromium in the reaction mass in addition to the chromium hydroxide already therein.

References Cited in the file of this patent

UNITED STATES PATENTS

| Number | Name | Date |
|---|---|---|
| 2,209,907 | Tarr | July 30, 1940 |
| 2,350,960 | Dawin | June 6, 1944 |
| 2,431,075 | Parsons | Nov. 18, 1947 |